US008756862B1

(12) United States Patent
Huberman et al.

(10) Patent No.: US 8,756,862 B1
(45) Date of Patent: **\*Jun. 24, 2014**

(54) HORTICULTURAL GROWTH MEDIUM (75) Inventors: Allan Huberman, Saugus, MA (US); William J. Watson, Rome, OH (US)

(73) Assignee: EZ Care Growing Technologies, LLC, Saugus, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,579

(22) Filed: Feb. 28, 2012

Related U.S. Application Data

(63) Continuation of application No. 12/570,193, filed on Sep. 30, 2009, now Pat. No. 8,122,642, which is a continuation-in-part of application No. 12/030,572, filed on Feb. 13, 2008, now abandoned.

(51) Int. Cl.
 *A01G 31/00* (2006.01)
 *C05F 11/02* (2006.01)
(52) U.S. Cl.
 USPC .............................................. 47/59 S; 71/24

(58) Field of Classification Search
 USPC ........................... 47/59 S, 1.01 F; 71/24, 903
 See application file for complete search history.

(56) References Cited

U.S. PATENT DOCUMENTS

| 3,300,896 | A | * | 1/1967 | Lunstroth | ...................... 47/59 R |
| 4,391,926 | A | * | 7/1983 | Creyf | ............................ 523/132 |
| 5,106,405 | A | * | 4/1992 | Goto | ................................... 71/7 |
| 5,803,946 | A | * | 9/1998 | Petcavich et al. | ................. 71/28 |
| 6,322,734 | B1 | * | 11/2001 | Zanten et al. | ................... 264/42 |
| 7,166,224 | B2 | * | 1/2007 | Tonkin et al. | ................. 210/640 |

* cited by examiner

*Primary Examiner* — Monica Williams
(74) *Attorney, Agent, or Firm* — Houston & Associates, LLP (57) ABSTRACT

A horticultural growing medium is made up of composted bark, a carbon-based fibrous material, a hydrophilic polymer, sea solid, and beneficial bacteria/fungicide. The materials are formed into a solid substrate having structural stability, with both micro and macro interconnecting pores. The addition of a controlled release fertilizer provides for a perfect combination of nutrients, water retention, and pest and fungus control.

29 Claims, 12 Drawing Sheets

HORTICULTURAL GROWTH MEDIUM

This application is a Continuation of U.S. application Ser. No. 12/570,193, filed on Sep. 30, 2009, which is a Continuation-in-Part of U.S. application Ser. No. 12/030,572, filed on Feb. 13, 2008, both of which are incorporated herein by reference in their entirety.

DESCRIPTION RELATIVE TO THE PRIOR ART

Plant growing media, as substitutes for soil and enhancers of soil, are well known in the prior art. An example is U.S. Pat. No. 6,711,850 (Yelanich) which describes the treating of a plant growing medium to promote improved wetting. Yelanich describes a mixture of coconut coir pith and a horticulturally acceptable surfactant. U.S. Pat. No. 5,451,242 describes an active synthetic soil for horticultural application having all the agro-nutrients essential for plant growth. Mulches are commonly used for retention of water in the prior art. Also, substrates to provide physical support for plants are also widely known in the prior art. An example of the latter invention is U.S. Pat. No. 6,219,968 (Belger), which describes and claims a solid body for growing plants, having a compact structure, and made of coco peat (coir) having an insertion area for plants on its top side. The present invention combines all of these elements, including a stable, structured substrate medium with other, additional features which make the present growth medium truly unique.

In the present invention a growing medium is described which provides a means for retaining moisture, and also contains controlled-growth fertilizer to nourish plants. It further contains beneficial bacteria, and most of the mineral elements required for optimum nourishment. Finally, the medium is generally formed into a porous substrate which contains both micro and macro pores, to promote both oxygen and water vapor retention. Such a substrate can be molded into any shape desired. When used for green walls or green roofs, the substrate is typically in the shape of a rectangular solid, between a foot and two feet in area, and about four inches in thickness. A substrate of such dimensions weighs much less than a pound, but is fairly tear resistant.

The material of the present design can also be molded into the shape of flower pots, or "flats", the small trays used by nurseries in selling newly sprouted plants.

The shapes into which this material can be molded are virtually unlimited. Seeds may be inserted into the substrates by puncturing the substrate with a nail or thin rod, and pushing the seed into the hole so produced. Young plants may be inserted into the substrate in the same manner. The size of the hole made depends only on the size of the root and stem of the plant. The consistency of the substrate is such that it is easy to puncture and easy to cut. Yet it is robust enough to survive continuous exposure to the environment.

Thus the present material provides all of the components needed for optimal plant growth, and further supplies structural support, in configurations which are virtually unlimited. The material can be ground up and added to soil, or used in place of soil, in containers, such as flower pots. In addition to the traditional applications this material is ideal for use in such emerging applications as green walls, green roofs, interior and exterior landscape applications and the like.

Green roofs are contained green spaces on top of human-made structures. Green walls or "vertical gardens, are similar to green roofs, but are vertically oriented on the sides of buildings or other structures, rather than horizontally affixed to the roofs of buildings. A green roof is typically an extension of the existing roof which incorporates a growing medium supporting plants growing on either areas of the roof, or over the entire roof. Reliable water proofing is generally required, and a drainage system is also part of the typical prior art green roof systems. Such systems are described in U.S. Pat. Nos. 7,204,057, 6,862,842, and 3 6,711,851.

Figure 2:
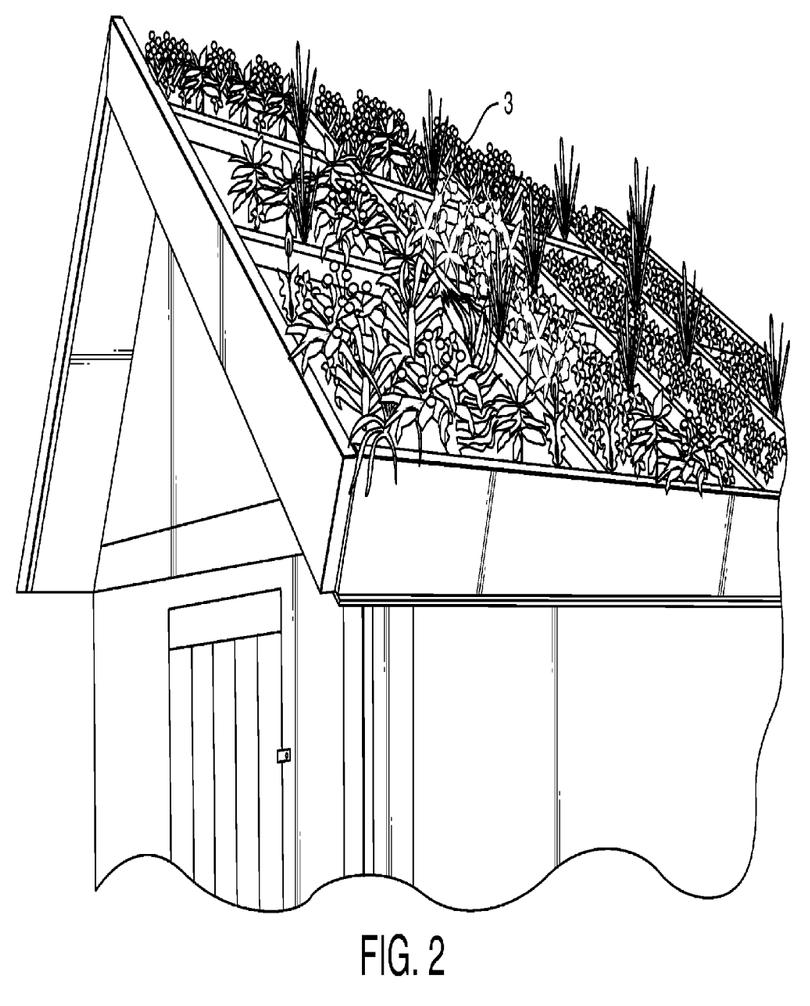
FIG. 2 depicts a perspective drawing of a building having a "green roof", with plants growing thereupon.
Figure 3:
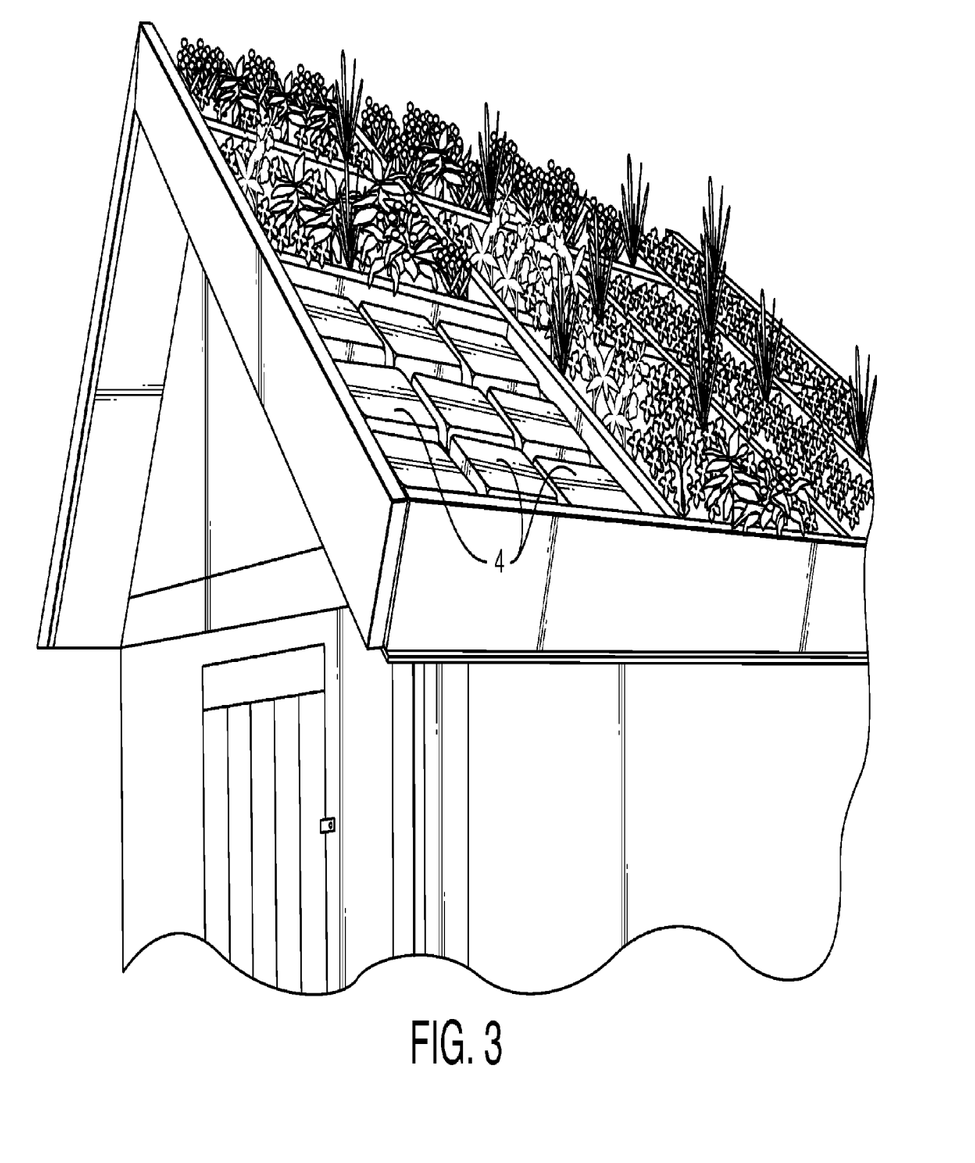
FIG. 3 depicts a perspective drawing of a building having a "green roof", with plants growing thereupon, and a cutaway section showing substrates of the present product disposed on the surface of the roof.

In contrast to the prior art, the present material provides a structured medium sufficiently robust so that it may be installed to provide green roofs and green walls without the extensive supporting structures previously required. Referring now to FIG. 2, a building having a prior art green roof is shown. Plants 3 are seen disposed on the surface of the roof. FIG. 3 shows an application of the present material, in which the substrates 4 containing the growth material described herein are simply placed on the surface of the roof, and the plants are planted in the substrates. The green wall, shown in FIG. 4, similarly contains the substrates 5 described herein, shown in cutaway view contained in baskets (not part of this invention.)

This structured substrate material can be configured into any shape desired. One advantage in the use of this material is that it can be made modular and of various thickness. The growing medium has superior water retention, keeping the growing plants moist for extended periods of time.

Finally, the structure of the present invention provides both interconnecting micro pores and macro pores to conduct both water vapor and oxygen to the roots of the plants growing in the medium, and maintains this pore structure over a period of time, unlike prior art materials in which the pores collapse with use. The basis for maintaining such a structure is dependent upon the use of modern binders, particularly diphenylmethane diisocyanate (MDI), which, when combined with the other elements of the invention, produces a polyurethane sponge. MDI has the advantage of not containing chemicals harmful to human life, in contrast to other prior-art binders used to produce polyurethane sponges.

The growing media of the present invention provides a unique environment for plant growth. It offers a robust physical substrate, containing all of the nutrients required for healthy plants, beginning with proper root development. It provides high aeration by means of the macro pores contained throughout the structure, as well as good water retention provided by the micro pores throughout, all of which pores remain within the structure during its lifetime. The high cation exchange capacity required for plant growth is provided for by the incorporation of composted bark. Time-release fertilizer further is included to feed the plants. And finally, fungicides and insecticides keep the plants from being attacked. The invention provides the perfect balance of air, water, and nutrients for growing a wide variety of plants. The advantages of the growth medium of the present invention may be summarized as follows:

a) Holds 50% more water than traditional soils;
b) Eliminates pot-bound roots;
c) Promotes expansive root growth;
d) Since moisture and air are regulated for ideal growing conditions by means of this growth medium, plants using it will not be over watered, no matter how much water is added;
e) Reduces watering required, thereby promoting healthier plants;
f) Water automatically migrates or wicks from the areas of higher moisture content to those of lower moisture content;
g) This growth medium automatically absorbs the correct amount of water, allowing oxygen access to the plant roots; and
h) The growth medium causes insulation and encapsulation of the roots, protecting them during dry conditions, and making the plants resistant to disease, rot, and pests.

SUMMARY OF THE INVENTION

It is an object of this invention to provide a structured substrate growing medium which combines water retention, nutrients, beneficial bacteria, and a robust physical structure containing both micro pores and macro pores.

In accordance with a first aspect of the invention, the growing medium contains sea solids containing trace elements, actino iron (a chemical alternative for use against root rot diseases), controlled-release fertilizer, composted bark, peat, and MDI.

In accordance with a second aspect of the invention the components are mixed and formed into polyurethane foam having interconnecting micro and macro pores.

In accordance with a third aspect of the invention the foam is molded into forms.

In accordance with a fourth aspect of the invention the material also contains a time-release fertilizer.

In accordance with a fifth aspect of the invention, the sea solid has a minimum concentration of 5 lbs per cubic yard, the beneficial bacteria have a minimum concentration of 0.25 lbs per cubic yard, and the controlled-release fertilizer has a minimum concentration of 1 lb per cubic yard.

In accordance with a sixth aspect of the invention, the hydrophilic polymer comprises between 8% and 10% of the medium substrate by volume.

In accordance with a seventh aspect of the invention, the carbon-based fibrous material comprises between 81% and 83% of the medium substrate by volume.

In accordance with an eighth aspect of the invention, the composted bark comprises between 7% and 9% of the medium substrate by volume.

In accordance with a ninth aspect of the invention, the carbon-based fibrous material comprises between 85% and 90% of the medium substrate by volume.

In accordance with a tenth aspect of the invention the composted bark comprises between 5% and 9% by volume.

In accordance with an eleventh aspect of the invention the hydrophilic polymer further comprises MDI.

BRIEF DESCRIPTION OF DRAWINGS

These, and other aspects of the invention, may be understood by reference to the attached drawings, in which.

DESCRIPTION OF PREFERRED EMBODIMENTS

The present invention has many innovative applications in the field of horticulture. Green roofs can be more easily produced, which are currently used to enhance the environmental and mitigate waste water problems. A typical green roof is shown in FIGS. 2 and 3.

Figure 4:
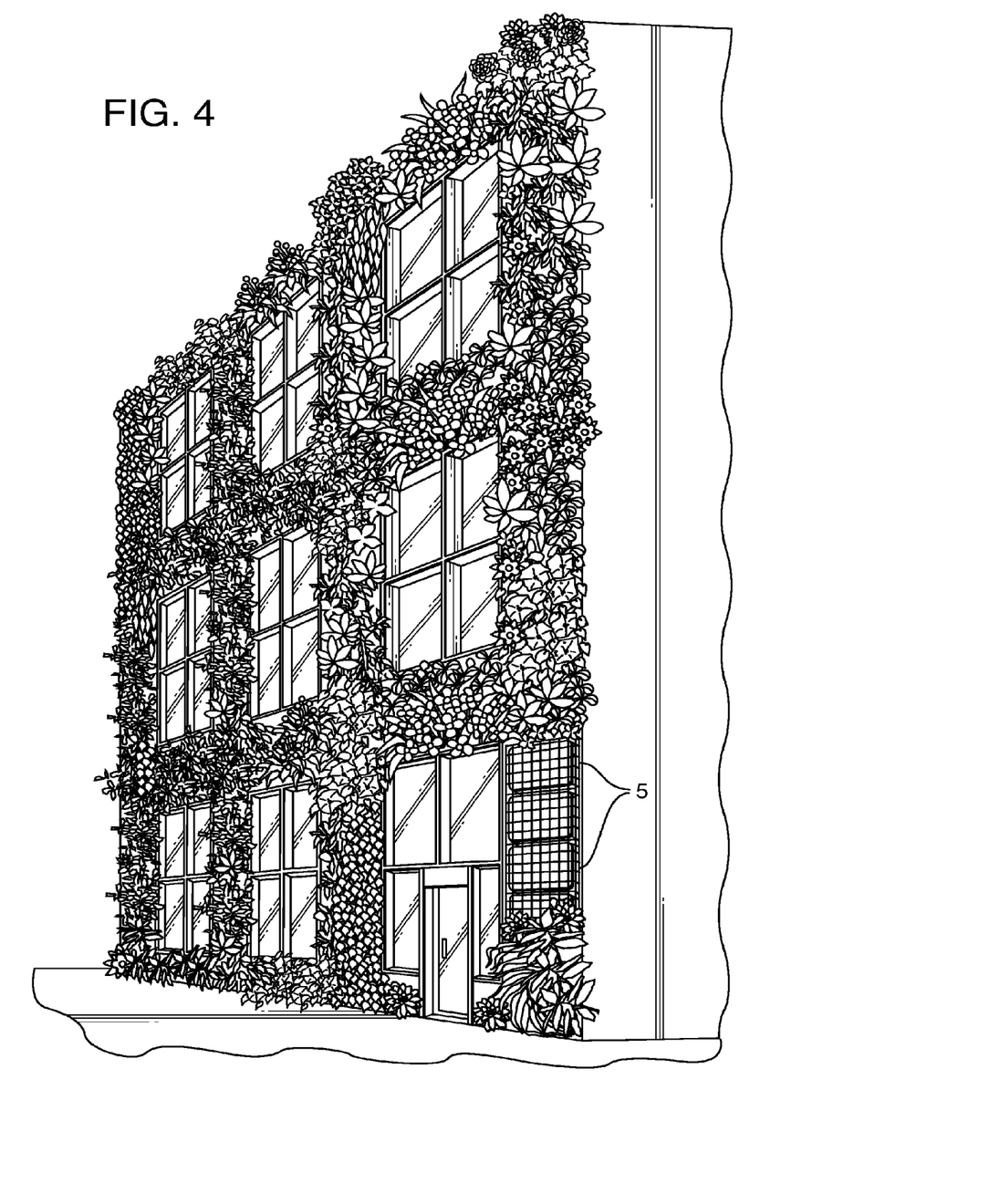
FIG. 4 depicts a perspective drawing of a building having a "green wall", with plants growing thereupon, and a cutaway section showing substrates of the present product disposed on the surface of the green wall.

A close relative of the green roof is the "living wall", or green wall, shown in FIG. 4, which is also a target for the present growth medium in substrate form. And the "Floating Island" is yet another example of an application which can utilize the substrate version of this grown medium to advantage.

The present grown media can be used to advantage as a replacement of soil in "rooting trays" or "sheet buns", or "Plug and play" presentation, in which plants are generally sold in the earliest stages of development.

Finally, a granular form of this present growth medium can be used to advantage both indoors and outdoors.

The markets which can utilize this growth medium to advantage include Habitat Restoration and Enhancement, Commercial Growers, and the Sod market.

The growth medium of the present invention is hydroponic in nature. It takes the place of soil. It prevents plant stress because it retains water and proper nutrients while preventing over or under watering. The medium also protects and insulates the roots of plants against disease and pests.

The present invention is particularly appropriate for the above applications. When used in the form of a polyurethane-based substrate, the present growth medium provides improved structural stability, both in improved wet strength, tensile strength, and tear resistance. It also has the ability to maintain the interconnecting pore structure of the substrate, so that water is evenly and uniformly dispersed to the plants planted therein.

The medium can also be shredded and used in place of potting soil, with most of the advantages of the substrate form. P-stone and stone dust may be added, giving this form of the growth medium the advantage of resisting dissipation from the wind.

Composition of the Growing Medium

The growing medium is composed of the following 5 essential elements in the proper proportions:

(a) composted bark
(b) a carbon-based fibrous material
(c) a hydrophilic polymer
(d) sea solids, typified by sea salt
(e) beneficial bacteria Each of these is discussed in the following description.

Beneficial Bacteria/Biological Fungicides

As used herein, the term "beneficial bacteria" is used to mean any bacteriological additives used to control and prevent soil-carried root rot and fungi. In the preferred embodiment a commercial product called Actino-Iron®, Manufactured by Natural Industries, Inc., of Houston, Tex., is used in this regard. Actino-iron contains biological grade iron and humate. It also contains the patented micro-organism *Streptomyces lydicus* which colonizes plant roots and protects them from rot. In the process the roots are actually encapsulated, so that fungus cannot reach the root surface.

The level of the *Streptomyces lydicus* in Actino-iron is about 2%, while Humic acid comprises about 45%. The majority of the balance of this material is iron. Iron is quite important in growth media, as it is a catalyst for photosynthesis. However, to be effective in regard to photosynthesis the iron must be "available iron". That is, it must not be fixed, or tied to other compounds.

It is believed that other micro-organisms of the genus *streptomyces* will also provide many of the benefits of Actino-iron, especially when accompanied by available iron and humus, in roughly the same proportions, within 10%.

The fungicides contained by the *streptomyces* in the Actino-iron actively attack certain types of fungi. The incorporation of this fungicide into the present invention provides a further benefit to the growing medium, allowing for hardier and larger root development, and healthier plants as a result.

In the preferred embodiment of the present formulation, the Actino-iron is used in minimum concentrations of 4 lb. per cubic yard.

The use of Actino-iron promotes a healthy root system, encapsulating the roots and protecting them against water molds as well as fungi. As a result, plants gowning in the growth medium described herein resist pests, and various kinds of disease, and can be effective as an agent for healthy plant growth without the need for insecticides. This makes the presently-described medium particularly useful in the growth of fruits and vegetables intended for human consumption.

Sea Solids

Sea solids, which are typified by sea salt, may be used to provide a variety of chemical elements, some in trace quantities, which have been shown to be beneficial to plant growth. Particular Sea solids, such as salt from the Dead Sea in Israel, have been analyzed and found to contain almost all of the mineral elements, and in the same concentration, as in human blood. This kind of sea salt contains all of the elements required for plant growth. Furthermore, it is hydrophilic, and enhances the water-holding capacity of the growth medium. In the present embodiment sea solid is added in a concentration of about 0.25 lbs per cubic yard, as a minimum.

Carbon-Based Fibrous Material

In the preferred embodiment of the present invention, peat is the chosen carbon-based fibrous material, which is the major component of the present invention in terms of volume. Peat is a superior material for this component because of its superior water-holding capacity and its capacity to retain nutrients.

In the preferred embodiment peat makes up 85% to 90% of the medium substrate by volume, of the horticultural growth material. It is one of many carbon-based fibers which can serve the purpose of providing the bulk of the material, giving it structure. Other candidates include coir (coconut fiber), compost from waste plants, cellulose, and ash.

Composted Bark

This component makes up between 7% and 9% of the volume of the horticultural growing material in the preferred embodiment. It provides a high level of cation exchange which is needed for root growth. It is widely known in the prior art that cation exchange is essential for the retaining of nutrients, and is included in the present invention for that purpose.

Hydrophilic Polymer

Figure 1:
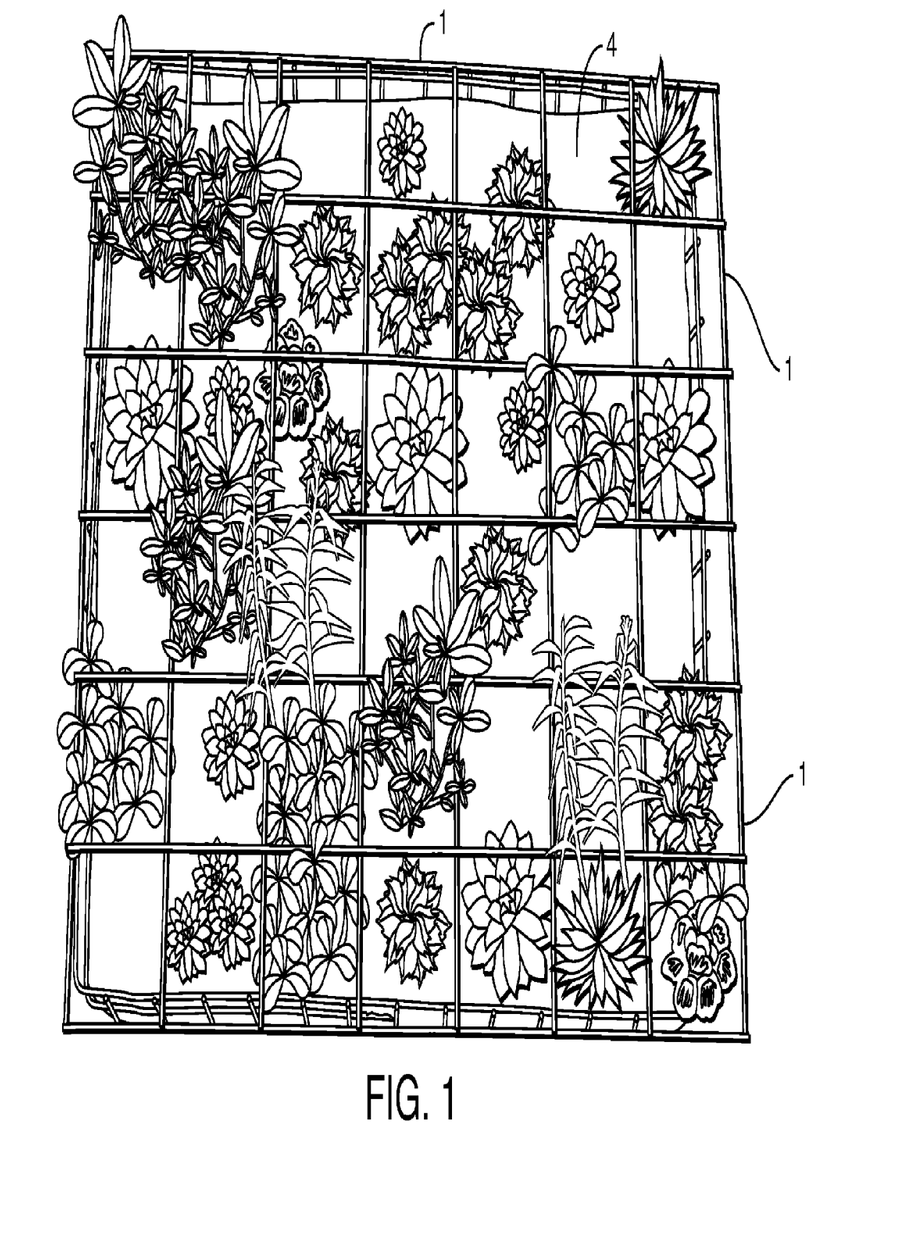
FIG. 1 shows a growing medium substrate, with plants growing thereupon, the substrate entirely filling a wire basket.

The physical structure of the preferred embodiment of the present invention is generally a substrate in the form of a hydrophilic polymeric sponge containing inter-connecting pores which make the other elements of the material available to the roots of the plants growing therein. FIG. 1 depicts such a substrate within a wire basket, having wires 1 (not part of the invention), the substrate filling the entire basket and flowers growing therein.

The above structure is created by the use of a material which, in the preferred embodiment of the present invention, is the polyurethane known as diphenylmethane diisocyanate (MDI). This material makes up between 5% and 20%, by volume, of the material.

The resulting substrate has several qualities essential to the present invention. First, it contains no components which are known to be harmful to humans and other living things, in contrast to other hydrophilic polymers, especially isocyanates, such as Toluene diisocyanate (TDI), which was formerly used in applications similar to the present invention.

Secondly, the use of MDI produces a stable, interconnecting pore structure with pore size which can range from microcellular to fully reticulated. Typical pore size will be between 0.2 mm and 4.0 mm. The pores in this material have been found to remain interconnecting over a period of years, unlike much of the competing growth material, in which the pores collapse within a year or so and thus lose their ability to continuously water the plants growing therein.

The resulting substrate made from MDI with the other elements of the present growth medium is light-weight, much lighter than potting soil, for example, and yet robust and resistant to tearing and weather erosion. It is thus suitable for use outside in all areas of the United States, regardless of weather conditions.

The Manufacturing Process

The present invention uses a manufacturing process which is well known in the prior art. The soluble components are dissolved in water, and the solution is then combined with the non-soluble components, including the peat moss and the composted bark. A binder, such as Hypol®, sold by Dow Chemical, helps to insure that pore structure is proper, which is essential for proper root growth. It has been found that inter-connecting pores between 30 and 1000 μm in size can be obtained in the poly-urethane sponge material, preferably MDI that permeates the substrates.

Example 1

The horticultural growing medium contains a minimum of ¼ lbs per cubic yard of sea solid, a minimum of 5 lbs per cubic yard of actino iron, a minimum of 1 lb per cubic yard of controlled-release fertilizer, 5-9% by volume of composted bark, 85-90% peat, and 5-20% of MDI. The components are mixed and formed into polyurethane foam having interconnecting micro and macro pores, and the foam is molded into forms.

Example 2

The horticultural growing medium contains a minimum of 0.25 lbs per cubic yard of sea solid, a minimum of 5 lbs per cubic yard of actino iron, a minimum of 1 lb per cubic yard of controlled-release fertilizer, 7-9% by volume of composted bark, 81-83% peat, and 8-10% of MDI. The components are mixed and formed into polyurethane foam having interconnecting micro and macro pores, and the foam is molded into forms.

Granular Growth Medium

Although the growth medium of the present invention is suitable for use in substrates, it can also be used as a granular growth medium which is suitable for potting plants of all kinds. In a further embodiment, a substrate of the growth medium of the present design is produced using, as an example, the manufacturing process described above. The substrate is then converted into an aggregate by first combining 66% of ¼ inch P-stone and 33% of stone dust. Next, 50% of the above aggregate to 50% to the growth medium of the present design, which growth medium has been first shredded to a particle size of ¼" or less. The resulting granular growth medium can be spread on a roof to a depth of 4 inches.

The resulting granular growth medium will be reasonably stable, as the P-stone and stone dust holds the material down and keeps it from blowing away. Thus, it does not require any additional container to keep it in place when used on a roof. Plants are planted directly in this granular growth medium However, the inclusion of the P-stone and stone dust increases the weight of the material far in excess of the weight of the substrates described above.

The determination of which kind of growth medium to use depends on the structural strength of the roof in question. Furthermore, the growth medium in the form of substrates is more practical not only when weight becomes a problem, but also in the case of vertical green walls and steep gable roofs.

Packaging the Substrate Material.

As has been discussed above, the configuring of the presently-described growth medium into structurally stable substrates facilitates ease of installation in green roofs and green walls, as well as reducing the weight that such structures must bear.

An additional advantage to this method of use is that, in many instances, including installation on flat roofs, the substrates may be laid directly on the roof without supporting structures to keep the material from blowing away. As an additional security measure, containers which are extremely porous and light weight may be used to hold the substrates. A basket structure, consisting of wires approximately equal to the size of the substrates, has shown to be a suitable form for the containing of the substrates when extra support is needed. This is especially true in the case of green walls, and roofs having particularly steep gables. FIG. 4 incorporates such basket structures containing substrates of approximate equal size within said basket structures.

FIG. 1 shows a more detailed view of a substrate contained within such a basket, with flowers growing in the substrate. The substrate shown in this figure is approximately square, and is about 24 inches square, with the container slightly larger. The container is made of a wire mesh, with wires between about 1/16 and 1/32 inches in diameter, and spaced about 3 inches apart. A convenient dimension for substrates in such applications is about 20-24 inches in length, and about 12 inches in width, and 4 inches in depth.

The exact diameters of the wire in the mesh are not critical, so long as the mesh has sufficient strength to survive rough handling.

Figure 5A:
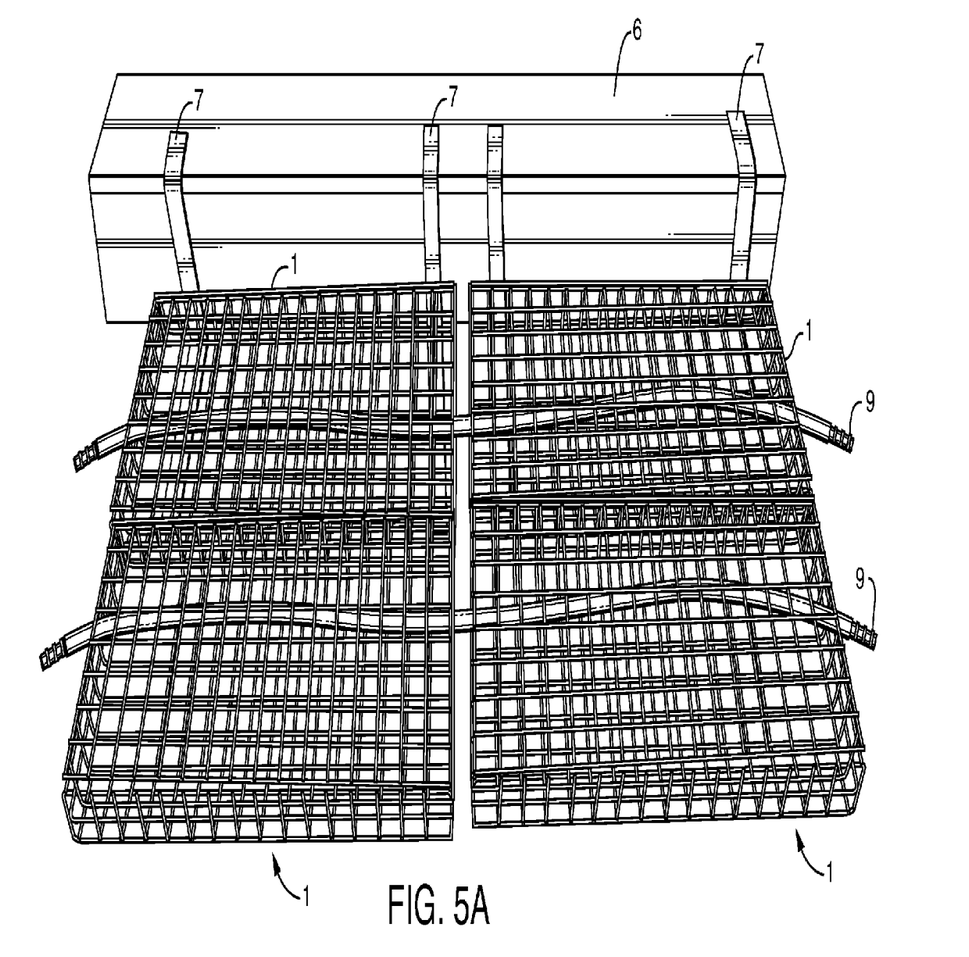
FIG. 5A depicts a perspective view of a substrate container, with watering tubes within, attached to a roof parapet.
Figure 5B:
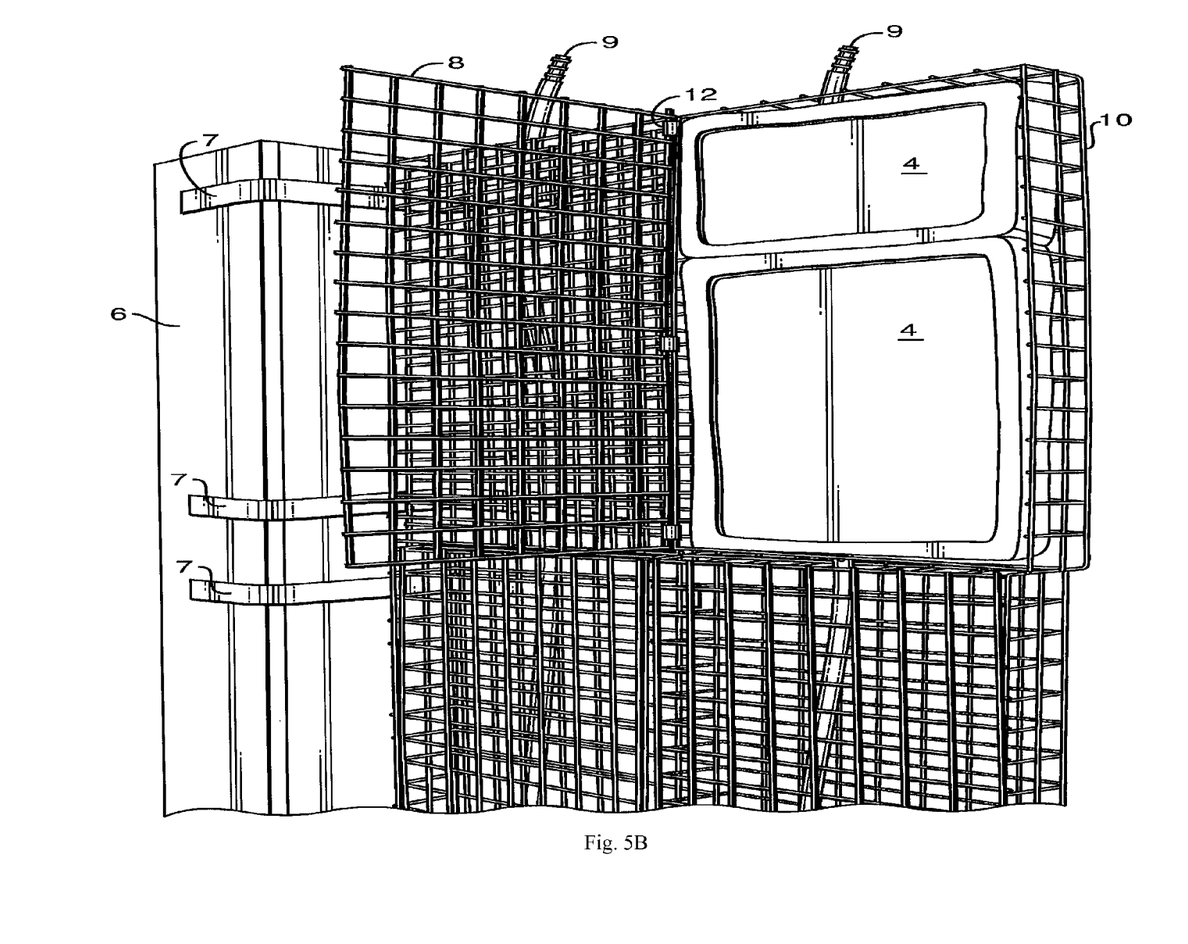
FIG. 5B depicts a perspective view of a substrate container, containing two substrates, with watering tubes within, attached to a roof parapet.

FIG. 5A shows how such basket structures may be used on a horizontal roof having parapets 6. The baskets 1 are affixed to the parapet using straps 7. Watering tubes 9 are used to convey water to the substrates 4 as needed. Although not shown in this figure, the tubes are typically attached to a pressurized water source which may be turned on or off as watering is required. Furthermore, the tubes may be attached to tubes on other baskets laterally disposed thereto. The tubes may be threaded at their ends, as shown in this figure, to facilitate attachment to mating tubes using unions generally available for use in attaching garden hoses to other hoses, to spigots, etc.

Figure 11:
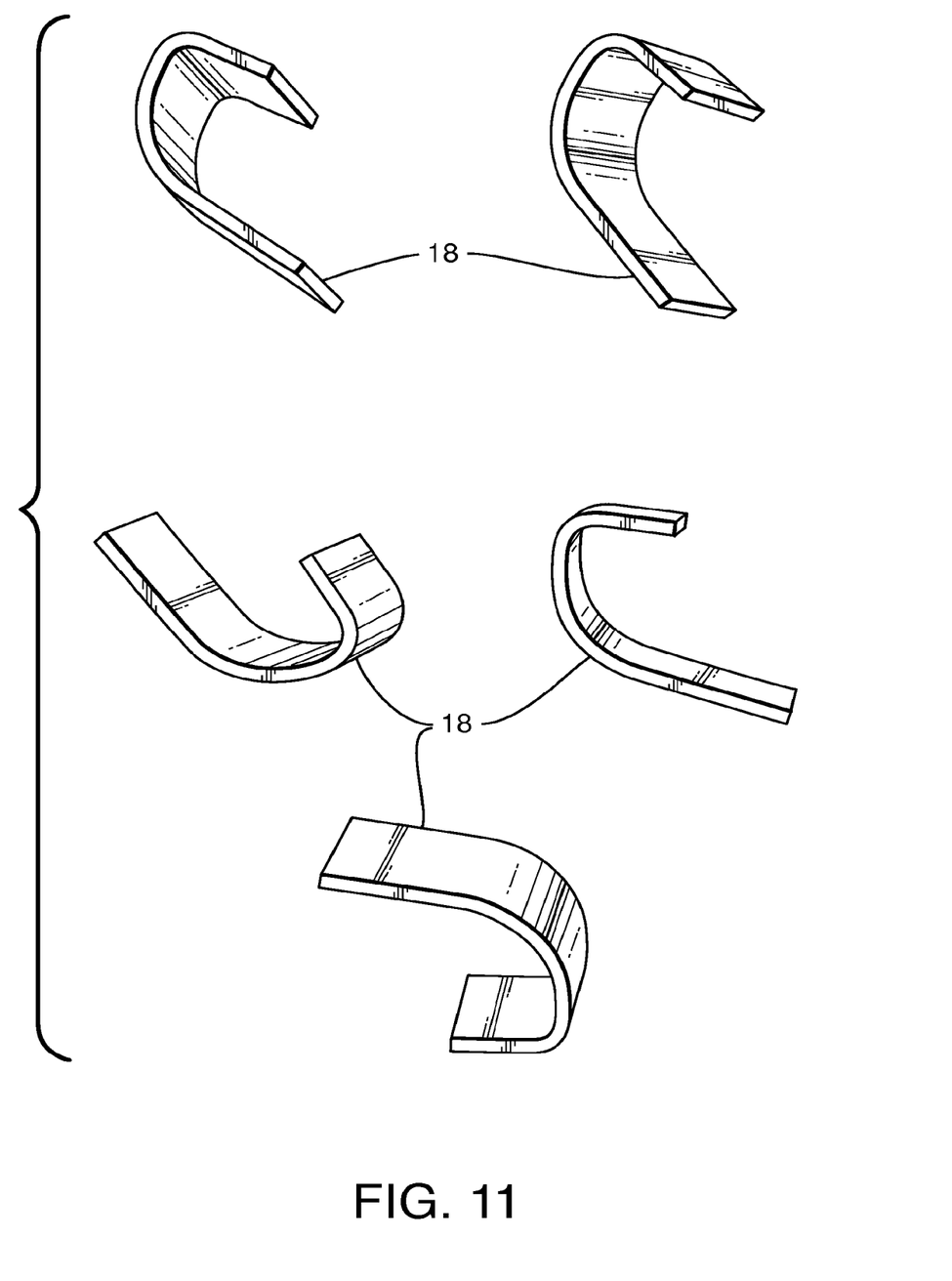
FIG. 11 depicts a perspective view of clips used to secure a substrate container.

The baskets have covers 8 also configured from the same kind of wire mesh as the rest of the container, upwardly rotatable by means of hinges 12. In the closed position the cover is secured to the rest of the container by means of metal clips, such as those clips 18 shown in FIG. 11

Figure 6:
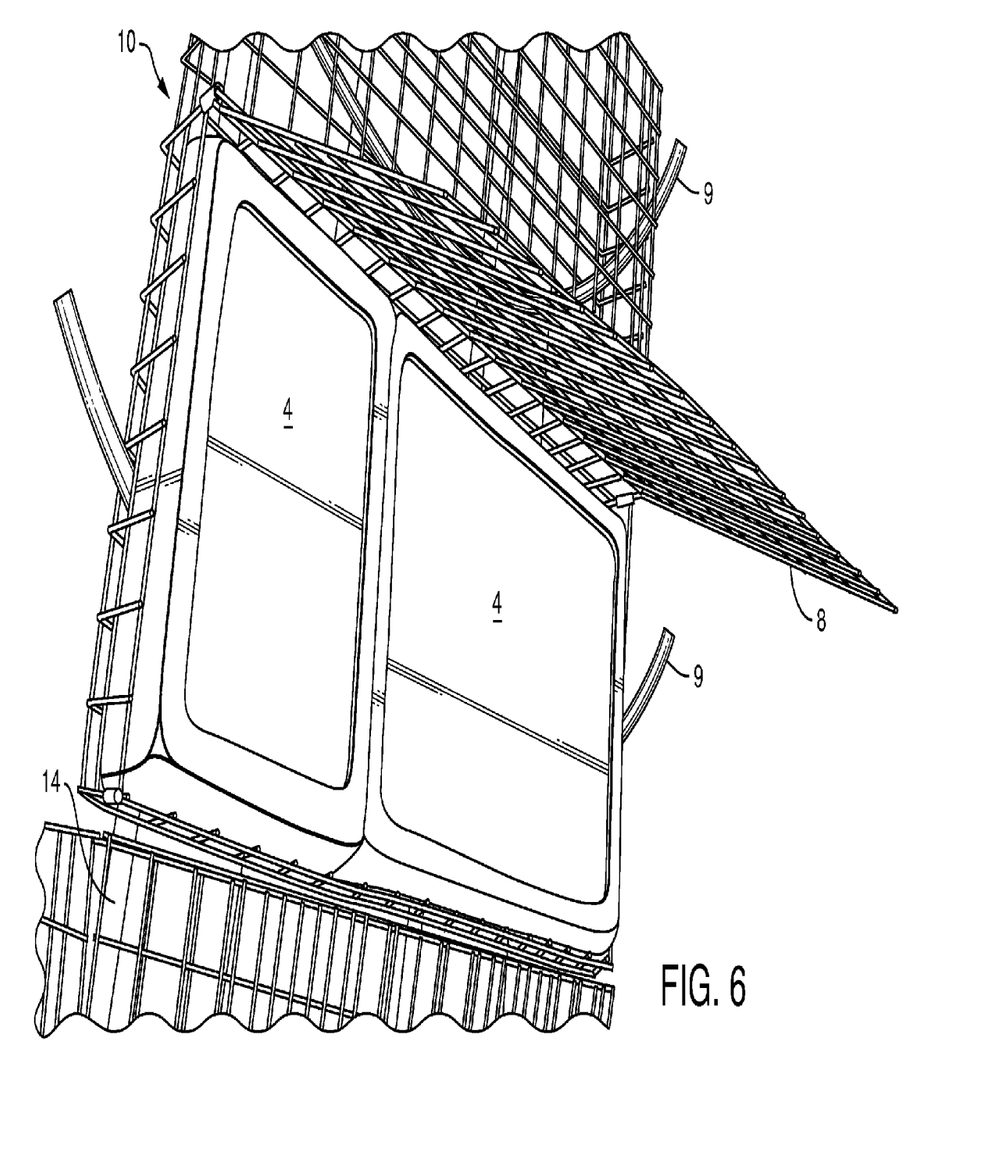
FIG. 6 depicts a detail of the perspective view of FIG. 5B.

Referring next to FIG. 6 a close-up of the container is seen. In this figure the watering tubes 9 are shown disposed beneath the substrates 4. The tubes are perforated to allow the water to escape into the substrates. In this drawing, a single basket has two covers, which is disposed above the first, and is in closed position. The baskets are affixed to mounting strips 14, beneath the baskets, facilitating the attachment of the baskets in a pre-arranged array to an external surface below.

Figure 7:
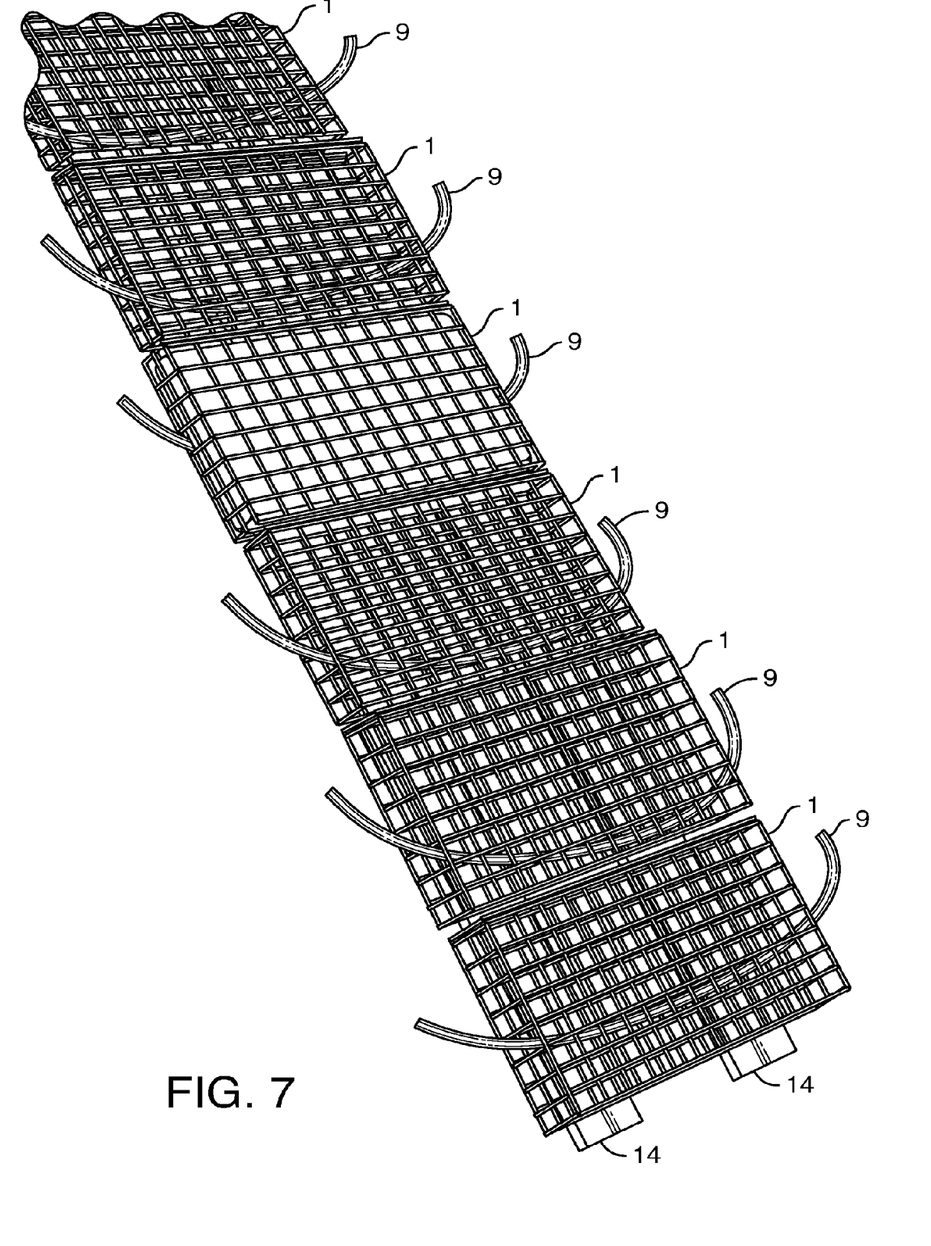
FIG. 7 depicts a perspective view of a set of substrate containers, suitable for use in a green wall or gable roof.

Such an array is shown in FIG. 7, with two of the mounting strips 14 attaching all of the baskets 1 of the array. Still referring to this drawing, it may be seen that a single watering tube 9 is disposed within each basket.

Figure 8:
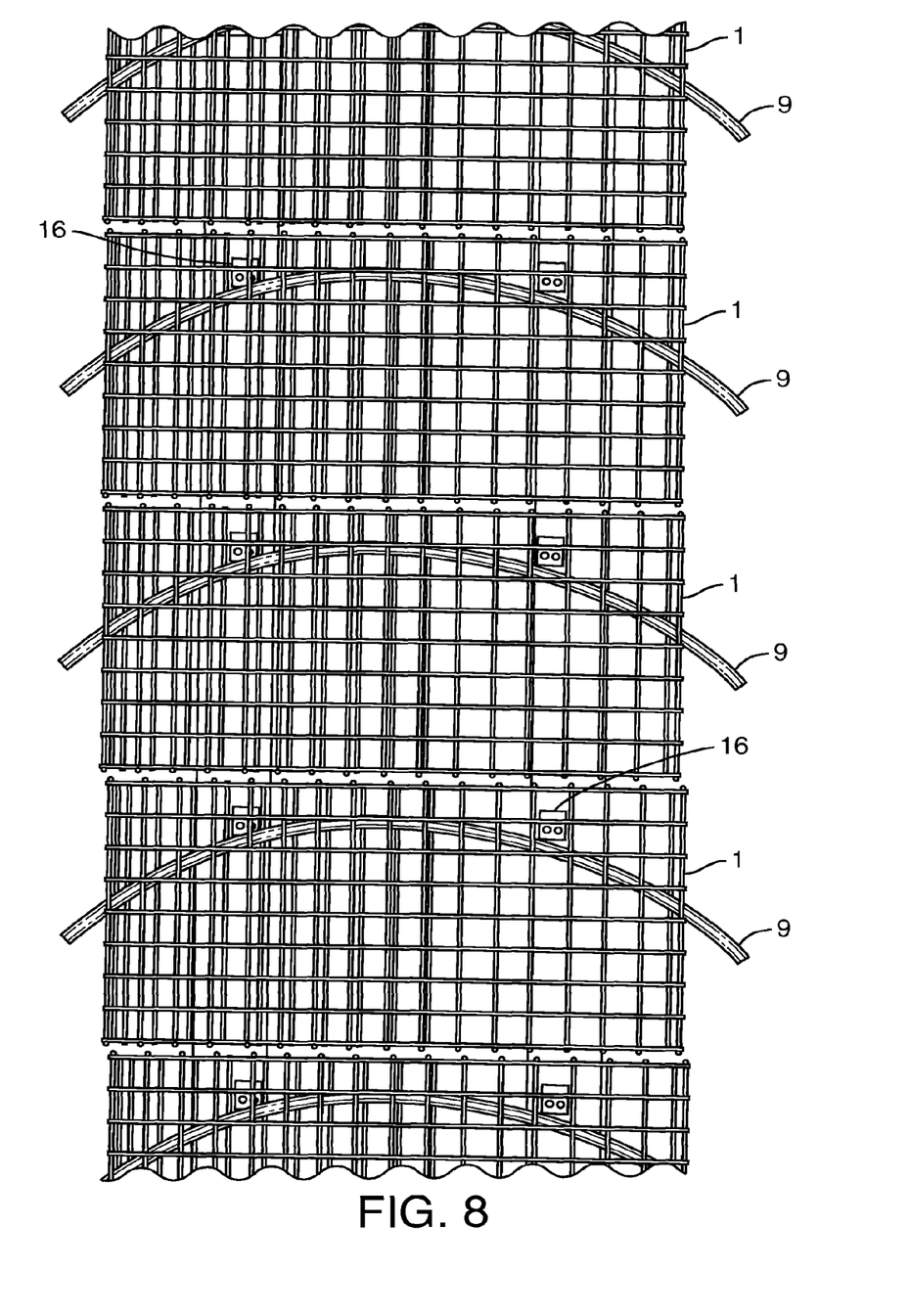
FIG. 8 depicts a side elevation detail view of the set of substrate containers of FIG. 7.
Figure 10:
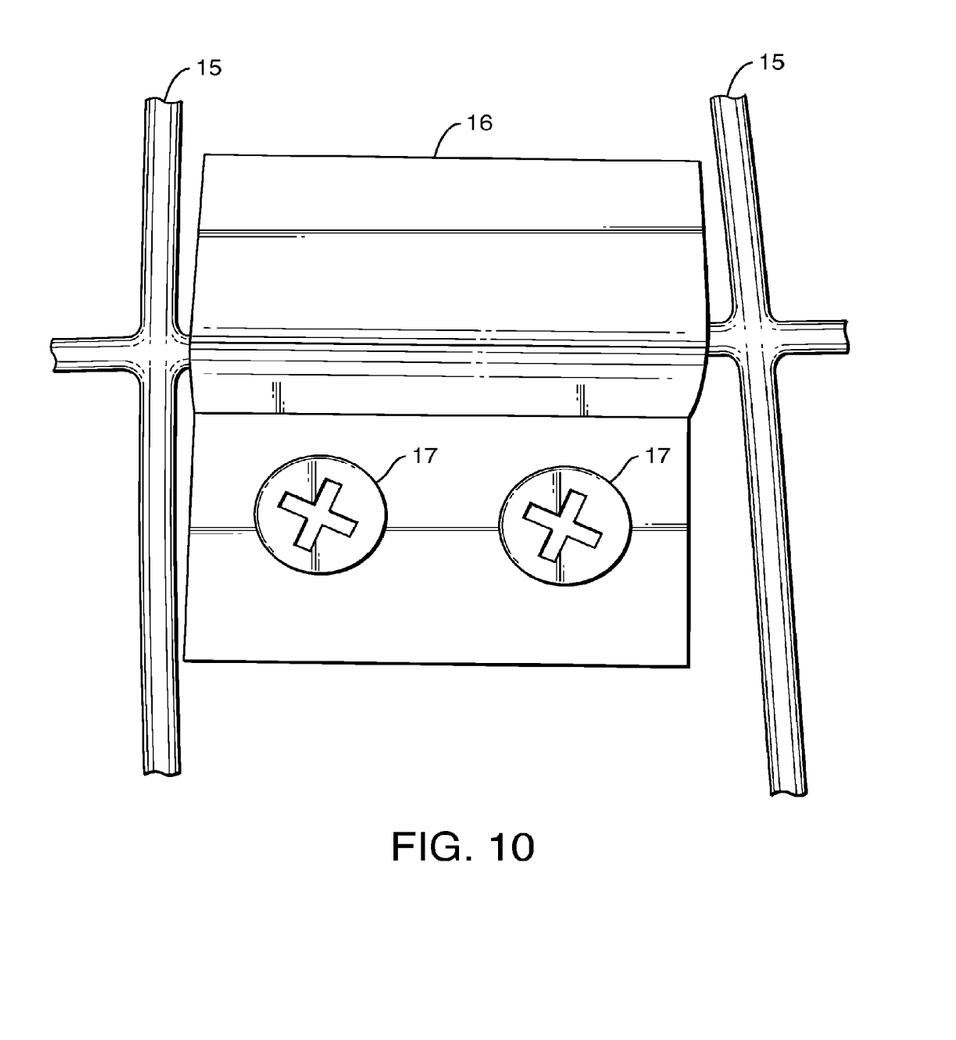
FIG. 10 depicts a perspective view of a mounting strap for attaching a substrate container to a planar surface.

Referring next to FIG. 8, an alternative mode of attachment is shown, in which the wire bottoms of the baskets are affixed directly to the surface beneath by means of pairs of clamps 16 attached by screws to the surface beneath. These clamps are shown in more detail in FIG. 10, which shows a typical such clamp 16 holding down a section of the wire mesh 15, and affixed to the surface beneath by means of screws 17.

Figure 9:
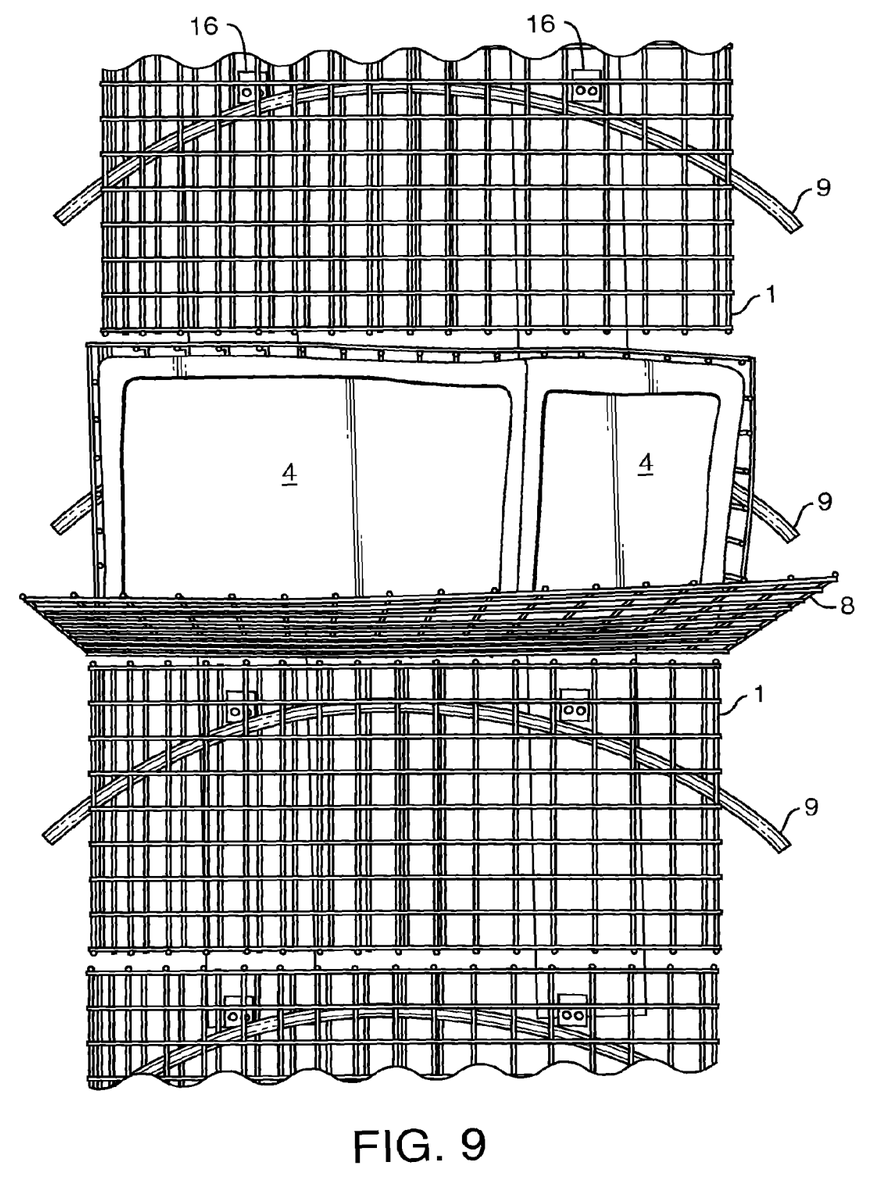
FIG. 9 depicts a detail view of the side elevation view of FIG. 8, with two substrates contained therein.

The drawing appearing as FIG. 9 shows an array of baskets separately affixed to a surface beneath using such clamps 16, and with substrates 4 disposed within one of the baskets 1, with the cover 8 in open position.

Such arrays of substrates are particularly effective for the construction of green walls, and for green roofs with steep gables. The wires should be non-corrosive to prevent deterioration by exposure to the weather. Stainless steel, copper, or bronze are particularly effective in this application.

Testing of the New Growth Medium

Tests have recently been performed to show the efficacy of the new growth medium in a commercial environment.

These tests were performed on about 50 different types of annuals in a commercial greenhouse. The plants tested included petunias, marigolds, lantanas, begonias, coleus, ostioporum, double impatiens, dahlias, asters, phlox, patio tomatoes, teacup tomatoes, grape tomatoes hanging, basil, oregano, chive, and parsley. These were purchased as rooted cells from 515 cells per tray down to 100 per tray.

The plants were received in 3 shipments. The first shipment arrived on Mar. 16, 2009; the second on Mar. 30, 2009; and the third on Apr. 16, 2009.

All these plants were taken out and re-planted either one to a 4½" pot, or 5 to a ten-inch hanging basket. This was done within 4 days of receipt in each case. The plants were potted in a combination of potting soil and an embodiments of the horticultural growth medium described above, containing a minimum of ¼ lbs per cubic yard of sea solid, a minimum of 5 lbs per cubic yard of actino iron, a minimum of 1 lb per cubic yard of controlled-release fertilizer, 5-9% by volume of composted bark, 85-90% peat, and 5-20% of MDI.

The components were mixed and formed into polyurethane foam having interconnecting micro and macro pores, and molded into forms. The molded material was then ground up until it had the consistency of peat moss. The ground up growth media was then mixed, at a proportion of 1 part potting soil to one part growth media.

All these plants were fertilized as soon as they were potted with 120-10-20 fertilizer, at 100 ppm (parts per million). They were all watered immediately.

Within 5 days after watering it was observed that the roots of these plants generally covered the entire inside of the pots in which they had been re-potted.

About 10 days later the plants were watered and fed for the first time. The plants continued to grow at a remarkable, accelerated rate.

Some of the tomatoes were ½ inch high when planted in pots after arriving in a 280 cell container. Two plants each were placed in 11-inch pots on Mar. 30, 2009 or perhaps a week later. On Apr. 28, 2009 the plants were 1 foot tall, with flowers, with steps as thick as a person's thumb. In the past, without the special growth medium, it required 6-8 weeks for the amount of growth just described.

Furthermore, in the past fertilization was done with a minimum of 200 ppm of the same 120-10-20 fertilizer. And in the past the plants were watered at least every other day. When the weather was hot the plants had to be fed and watered every day. In the past the roots covered the pots only after 2 weeks, making the plants pot-bound. Using the new growth medium plants don't become pot bound.

At present about 150-200,000 plans are being used in these tests. In past, at the time after receipt of the plants from the sellers, about 20% of the plants were thrown out due to rot, different diseases, insects, etc. In contrast, with the plants planted in the combination of the new growth media described above and potting soil, there has been virtually no spoilage, and no plants have been thrown out.

Test has also been run using the new horticultural growth media for roof and wall plantings. The growth medium was molded into solid, spongy substrates (blocks) 1 foot by 2 feet by 3 inches in size. Each such block weights about 4 pounds dry.

After soaking in water, each block increased its weight to about 24 pounds, thus demonstrating the tremendous water retention capability of these blocks. Typically these blocks can absorb 5 times their weight in water.

The blocks have also demonstrated their ability to become re-wettable: that is, after soaking up the amount of water above, and then drying out completely, the material may be soaked again, and will weight about 24 pounds. This process may be repeated over and over, and the results are the same, in contrast to virtually every known substrate used in such applications.

A combination of variegated ivy and green ivy plants were inserted in each block by putting a hole in the block and inserting a round plug ½ inch in diameter containing a ½ inch tall plant. The process was repeated with the plugs about 6 inches from each other until the block was completely filled with plugs.

These ivy plants were put in Nov. 25, 2008. They rooted in within 3-4 days into these structured substrate blocks. They were fertilizing two weeks later with 100 ppm 20-10-20 fertilizer. At the beginning they were watered every 10 days. After 5 months they have grown out profusely and with long runners, and still healthy despite the fact that they have not been watered in a month.

In January, 2009, the ivy showed no symptoms of disease, and no pathogens. The roots had formed a mat by that time. The blocks were all filled in by then, with the plant growth so thick that the underlying substrate material could hardly be seen.

The remarkable results described above, including highly accelerated growth, no discernable spoilage, water retention, and food retention, are believed to be entirely due to the use of the new horticultural growth media as described above.

To summarize the advantages of this present growth medium, it should be noted as follows:

1. It are hydrophilic. It retains water for prolonged periods of time, and resists evaporation into the atmosphere. It further absorbs water from the atmosphere. The substrates composed of this grown medium do not need watering, often for weeks, as compared to daily or every-other day watering for plants planted in soil.

2. It will not absorb too much water. It will only absorb a certain amount of water, and then will repel the rest. As an example, a substrate 24 by 12 by 3 inches will absorb about 20 lbs of water under normal watering conditions. However, even if the substrate is soaked in water it will not absorb more than 20 lbs of water. As a result, the plants planted in a substrate of the present invention will not become waterlogged, and will not cause the roots to rot.

3. The growth medium contains all the nutrients required for the plants planted therein.

4. The growth medium repels pests, disease, and rot, due, in part, to the *streptomyces* compound which makes up part of the material.

As a result of all the above, this growth medium will lend itself to applications such as green roof planting, where accessibility is difficult. Plantings in the present growth medium require a minimum of access, since they need not be watered very often, and plants generally survive in much greater quantities than in other, previously used planting media.

The substrates composed of this growth medium are particularly applicable for green walls, and for roofs having very steep angles, since the substrates can be packaged in the baskets described above, thereby having a substantially planar surface in contact with the roof or wall, and adding only a few inches to the dimensions of the roof or wall.

While the invention has been described with reference to specific embodiments, it will be apparent that improvements and modifications may be made within the purview of the invention without departing from the scope of the invention defined in the appended claims.

The invention claimed is:

1. A horticultural growing medium, comprising:
   a) a carbon-based fibrous material as a major component by volume;
   b) a porous structure formed from a hydrophilic polyurethane;
   c) sea solids having a minimum concentration of ¼ lbs per cubic yard;
   d) biological grade iron;
   e) humus, humate or humic acid; and
   f) *Streptomyces* micro-organisms;
   wherein the horticultural growing medium contains micro and macro pores and has a capacity to absorb and retain water, and to be repeatedly re-wetted without losing its water holding capacity.

2. The horticultural growing medium in accordance with claim 1, wherein the medium is molded into substrates into which plants are inserted and grown.

3. The horticultural growing medium in accordance with claim 2, wherein the medium is molded into brick-like forms, and further comprising wire mesh baskets having rotatable wire mesh covers, into which the substrates can be inserted and retained.

4. The horticultural growing medium of claim 3, further comprising means for affixing said wire mesh baskets to a wall, so that the plants growing from the brick-like forms cover entire sections of the wall, and comprise the appearance of a "green wall".

5. The horticultural growing medium of claim 3, further comprising one or more watering tubes in each wire mesh basket, through which water is introduced into said brick-like forms.

6. The horticultural growing medium of claim 3, further comprising means for disposing said wire mesh baskets to a roof, so that the plants growing from the brick-like forms cover entire sections of the roof, and comprise the appearance of a "green roof".

7. The horticultural growing medium of claim 1, wherein the porous structure is formed from a diphenylmethane diisocyanate-based polyurethane.

8. The horticultural growing medium of claim 1, wherein the porous structure is formed using a diphenylmethane diisocyanate (MDI) material containing between 5% and 20% diphenylmethane diisocyanate (MDI) by volume of the material.

9. The horticultural growing medium of claim 1, comprising hydrophilic polyurethane in an amount of 8-10% by volume.

10. The horticultural growing medium of claim 1, comprising hydrophilic polyurethane in an amount of 5-20% by volume.

11. The horticultural growing medium of claim 1, wherein the carbon-based fibrous material comprises between 85% and 90% of the horticultural growing medium by volume.

12. The horticultural growing medium of claim 1, wherein the carbon-based fibrous material comprises between 81% and 83% of the horticultural growing medium by volume.

13. The horticultural growing medium of claim 1, wherein the carbon-based fibrous material is selected from peat, coir, compost from waste plants, cellulose and ash.

14. The horticultural growing medium of claim 1, further comprising composted bark.

15. The horticultural growing medium of claim 14, wherein the composted bark comprises between 5% and 9% of the horticultural growing medium by volume.

16. A granular growth medium comprising shredded horticultural growing medium according to claim 1.

17. An aggregate comprising shredded horticultural growing medium in accordance with claim 1, P-stone and stone dust.

18. An aggregate comprising:
   a) 50% of the horticultural growing medium of claim 1 which has been shredded to a particle size of ¼" or less;
   b) 33% of ¼ inch P-stone; and
   c) 17% of stone dust.

19. A mixture comprising ground horticultural growing medium of claim 1 in combination with potting soil.

20. The mixture of claim 19, comprising one part of ground horticultural growing medium and one part potting soil.

21. The mixture of claim 19, further comprising a fertilizer.

22. A rooting tray, sheet bun, or plug comprising the horticultural growing medium of claim 1.

23. A green roof, living wall, potted plant or sod including the horticultural growing medium of claim 1.

24. The horticultural growing medium of claim 1, wherein the horticultural growing medium has the capacity to absorb and retain at least five times its weight in water.

25. A method for producing a horticultural growing substrate, the method comprising:
   i) combining:
      a) a carbon-based fibrous material as a major component by volume;
      b) a hydrophilic polyurethane;
      c) sea solids at a minimum concentration of ¼ lbs per cubic yard of the substrate;
      d) biological grade iron;
      e) humus, humate or humic acid; and
      f) *Streptomyces* micro-organisms;
   and
   ii) molding the resulting mixture into a form to produce the horticultural growing substrate, wherein said substrate contains micro and macro pores and has a capacity to absorb and retain water, and to be repeatedly re-wetted without losing its water holding capacity.

26. The method of claim 25, further comprising shredding or grinding the horticultural growing substrate.

27. The method of claim 26, further comprising adding a fertilizer to the shredded or ground horticultural growing substrate.

28. The method of claim 25, wherein the components being combined in step (i) further include composted bark.

29. The method of claim 25, wherein the horticultural growing medium has the capacity to absorb and retain at least five times its weight in water.

* * * * *